US010754830B2

(12) United States Patent
Landau et al.

(10) Patent No.: US 10,754,830 B2
(45) Date of Patent: Aug. 25, 2020

(54) ACTIVITY INFORMATION SCHEMA DISCOVERY AND SCHEMA CHANGE DETECTION AND NOTIFICATION

(71) Applicant: NETFLIX, INC., Los Gatos, CA (US)

(72) Inventors: Airan Landau, Saratoga, CA (US); Sudhir Tonse, Fremont, CA (US)

(73) Assignee: NETFLIX, INC., Los Gatos, CA (US)

( * ) Notice: Subject to any disclaimer, the term of this patent is extended or adjusted under 35 U.S.C. 154(b) by 1077 days.

(21) Appl. No.: 14/454,632

(22) Filed: Aug. 7, 2014

(65) Prior Publication Data

US 2016/0042015 A1    Feb. 11, 2016

(51) Int. Cl.
*G06F 16/21* (2019.01)
*G06F 16/951* (2019.01)

(52) U.S. Cl.
CPC .......... *G06F 16/211* (2019.01); *G06F 16/951* (2019.01)

(58) Field of Classification Search
CPC ......... G06F 17/30368; G06F 17/30292; G06F 17/30297; G06F 16/84; G06F 16/213; G06F 16/212; G06F 16/211
See application file for complete search history.

(56) References Cited

U.S. PATENT DOCUMENTS

| | | | | |
|---|---|---|---|---|
| 9,760,571 B1 * | 9/2017 | Ben-Natan | ............... | G06F 16/93 |
| 2005/0086584 A1 * | 4/2005 | Sampathkumar | ... | G06F 17/2247 715/235 |
| 2006/0106746 A1 * | 5/2006 | Stuhec | ............... | G06F 17/30569 707/1 |
| 2006/0161558 A1 * | 7/2006 | Tamma | ............... | G06F 11/0709 707/100 |
| 2006/0167880 A1 * | 7/2006 | Meijer | ...................... | G06F 8/30 707/9 |
| 2009/0240694 A1 * | 9/2009 | Jensen | ..................... | G06F 16/00 |
| 2009/0271419 A1 * | 10/2009 | Bornhoevd | ....... | G06F 17/30292 707/100 |
| 2009/0292745 A1 * | 11/2009 | Bose | ................. | G06F 17/30569 707/204 |
| 2013/0179769 A1 * | 7/2013 | Gurfinkel | ............ | G06F 17/2247 715/234 |
| 2015/0356123 A1 * | 12/2015 | Gorelik | ............. | G06F 17/30297 715/765 |

* cited by examiner

*Primary Examiner* — Marc S Somers
(74) *Attorney, Agent, or Firm* — Artegis Law Group, LLP (57) ABSTRACT

Techniques for activity information schema discovery, schema change detection, and notification. In one embodiment, for example, a computer-implemented method for activity information schema discovery and schema change detection and notification comprises: analyzing a first set of related activity messages obtained during a first sample period; determining first schema counters for uniquely named properties identified in the first set of messages based on the analyzing of the first set of activity messages; after the first sample period, inferring a first schema from the first schema counters; analyzing a second set of related activity messages obtained during a second sample period; determining second schema counters for uniquely named properties identified in the second set of messages based on the analyzing of the second set of activity messages; after the second sample period, inferring a second schema from the second schema counters; comparing the first schema and the second schema for any differences.

18 Claims, 2 Drawing Sheets

ACTIVITY INFORMATION SCHEMA DISCOVERY AND SCHEMA CHANGE DETECTION AND NOTIFICATION

FIELD OF THE INVENTION

The present invention relates to services that use activity information to provide and support the services.

BACKGROUND

Many online services generate large amounts of "activity" information. Typically, activity information includes "user activity" information and "system activity" information. User activity information includes information reflecting users' online interaction with the service such as, for example, logins, page views, clicks, "likes", sharing, recommendations, comments, search queries, etc. System activity information includes system operational metrics collected for servers and/or virtualized machine instances supporting the online service such as, for example, call stack traces, error messages, faults, exceptions, CPU utilization, memory usage, network throughput metrics, disk utilization, etc.

Traditionally, online services have leveraged activity information as a component of service analytics to track user engagement, system utilization, and other usage and performance of the service. Often, the analytics involve batch processing activity information. More recently, online services use activity information in real-time directly in end-user features. For example, an Internet search engine service may use activity information to provide more relevant search results, an online shopping service may use activity information to provide more relevant product recommendations, an online advertising service may use activity information to provide more targeted advertisements and promotions, and a social networking service may use activity information to provide a newsfeed feature.

Because of the large numbers of users, many online services generate large volumes of activity information, sometimes within a short period of time. For example, the Netflix service (available from Netflix, Inc. of Los Gatos, Calif.) which, among other services, provides an Internet streaming media service to millions of subscribers, has been known to generate activity information for up to 80 billion online user events per day. These user events include subscriber membership changes, subscription changes, streaming media playback events, user preference changes, among others.

In order to reliably collect large amounts of activity information from applications of an online service that generate them (producer applications) and provide them in a timely manner to applications of the online service that use the activity information (consumer applications), many online services implement a data pipeline to reliably and efficiently "move" the activity information generated by the producer applications to the consumer applications. In this description, the term "application" is used to refer to computer-implemented functionality of an online service. Typically, an application is implemented in software executing as one or more computer processes on one or more computing devices (e.g., one or more servers in a data center environment). Thus, an online service may be viewed as a collection of one or more applications, each of which may provide different portion of the functionality and support for the online service, but collectively provide the overall functionality and support for the online service. For example, some applications of an online service may provide end-user functionality and other applications may provide site performance and usage analytics to service operators.

As typically implemented, a data pipeline is a collection of computer systems designed to facilitate message passing and brokering of large-scale amounts of activity information from producer applications to consumer applications for batch or real-time processing. In some cases, the data pipeline includes a distributed commit log for durably storing recent activity information obtained from producer applications and also includes a messaging brokering system (e.g., a queuing system or a publish-subscription system) for providing stored activity information to consumer applications in a timely manner.

Often, different pieces of activity information that pass through a data pipeline from producer applications to consumer applications have different data formats. For example, one producer application may generate activity information in the form of log lines and another producer application may generate activity information in the form of highly-structured markup-language (e.g., XML) documents. On a more fined-grained level, values in a piece of activity information can have different data formats. For example, one producer application may generate activity information in which calendar date values are formatted using a two-character sequence to designate the calendar year (e.g., "14") and another producer application may generate activity information in which a four-character sequence is used (e.g., "2014"). More generally, activity information generated by producer applications may not conform to a single or a small number of known data formats and different pieces of activity information can have different formats. Further, the data format of activity information generated by a producer application may change over time. Moreover, it may be a design goal of the data pipeline to allow producer applications to generate activity information in whatever data formats the human software developers of the producer applications deem appropriate, as opposed to imposing or prescribing data formats that activity information generated by the producer applications must adhere to.

As different pieces of activity information can have different data formats, which can change over time, a challenge in implementing a data pipeline is to provide activity information to consumer applications in a data format that is expected. Historically, this challenge has been solved by ad-hoc communications between software developers of producer and consumer applications. For example, a software developer may design or configure the producer application to generate activity information in a particular custom log line format in which calendar date values use a four-character sequence to represent the calendar year. The producer application software developer may communicate this format to software developers of consumer applications as the format they should expect for activity information received from the producer application. The software developers of the consumer applications may then design or configure the consumer applications to expect this data format. If the producer application is subsequently re-designed or re-configured to generate activity information in a different format (e.g., to use a two-character sequence to represent the calendar year), the software developer must remember to communicate the format change to the software developers of the consumer applications. In worst cases, an uncommunicated format change causes a consumer application to fail or otherwise not provide expected functionality because the consumer application is not designed or configured to expect activity information from the producer application in the new data format.

Another problem with uncommunicated data format changes to activity information is that such changes can "break" rules used by computer systems in the data pipeline to route activity information obtained from producer applications to the consumer applications. For example, an online service may include an application that is configured to automatically send an e-mail to new subscribers greeting them to the service. To do so, a "binding rule", or other pre-arranged criteria for routing activity information accepted from producer applications toward consumer applications, may be registered with an activity information routing or messaging brokering system in the data pipeline. The binding rule may express that the greeting application would like to receive certain activity information generated by a subscriber management application when a new subscriber enrolls in the service. When the routing or message brokering system obtains activity information from the subscriber management application satisfying the binding rule, it will provide the activity information to the greeting application. For example, the routing or messaging brokering system may place the activity information in a message queue from which the greeting application reads the activity information. However, if the subscriber management application is re-designed or re-configured to generate activity information such that the generated activity information no longer satisfies the binding rule, then the greeting application may no longer be notified when a new subscriber is enrolled. As a result, the new subscriber may not receive the e-mail welcoming them to the online service.

Even where communication between software developers of producer and consumer applications with the respect to activity information data format changes is consistent, such communication may be considered inefficient or cumbersome.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

General Overview

Techniques are described herein for automatically discovering schemas in activity information. For example, a schema may be discovered for activity information generated by a first producer application of an online service. At the same time, another schema may be discovered for activity information generated by a second different producer application of the online service.

The techniques further include automatically detecting changes to the schema and automatically sending notifications when the schema change is detected. For example, a schema may be discovered for activity information generated by a particular producer application of the online service. After discovering the schema, a change to the schema may detected and an e-mail message or text message sent to a person responsible for the producer application, or a person responsible for a consumer application that subscribes to the activity information generated by the particular producer application. In this way, the person responsible is automatically notified when a change to activity information is detected that could affect a binding rule that the consumer application relies on. Techniques for discovering schemas in activity information and detecting schema changes are described in greater detail below.

Activity Messages

A piece of activity information generated by an application of the online service is referred to herein as an "activity message". An activity message can be structured or semi-structured data. In many cases, an activity message is not structured (i.e., is semi-structured). Structured activity message data includes data that conforms to a known data model that determines the manner in which the data must be formatted. For example, data that conforms to a relational database data model is sometimes considered to be structured data. Semi-structured activity message data is data that may not conform to a data model but that nonetheless contains tags, whitespace characters, or other markers to separate and designate semantic elements and, optionally, enforce hierarchies of semantic elements within the data. For example, data formatted in eXtensible Markup Language (XML) or JavaScript Object Notation (JSON) is sometimes considered semi-structured data.

An activity message is typically generated in response to the occurrence of some event within the online service. Accordingly, an activity message may be also be referred herein as an "activity event". Typically, the event is a user event or an operational event. For example, when a user views a web page of an online service (an event), a web server may record the network address of the user's device and the web page viewed in a log file (an activity message). As another example, the CPU utilization of a database server over a period of time (an event) may be recorded by a monitoring system as a system metric (an activity message). For an online service with a large-user base in which a large number of events occur (e.g., up to billions of events per day), the online service may generate millions or more of activity messages per second. The generated activity message may have many different data formats. The techniques described herein can be implemented within an online service to discover schemas in the various activity messages generated by the online service and to detect changes to the schemas over time.

Producer and Consumer Applications

An application of the online service that generates activity messages can be a producer application, a consumer application, or both a producer application and a consumer application. An application that generates activity messages is referred to herein as a producer application. An application that uses activity messages to provide or support the online service is referred to herein as a consumer application. For an application that is both a producer application and a consumer application, when referring to the application in the context of the application generating activity messages, the application is referred to herein as a producer application, and when referring to the application in the context of the application using activity messages, the application is referred to herein as a consumer application.

Sample Period

According to an embodiment, the online service obtains activity messages generated by one or more producer applications. Activity messages generated by just one producer application, or more than one producer application may be obtained. Although not a requirement of the present invention, the temporal order of obtaining activity message may roughly correspond to the temporal order in which the activity messages were generated by the producer applications. However, no particular manner of obtaining activity messages is required and the manner in which activity messages are obtained may vary according to the requirements of the particular implementation at hand. For example, activity messages may be obtained over a data network according to a suitable networking protocol from a distributed commit log, a messaging queuing system, a message brokering system, a publish-subscription system, or other system or component of a data pipeline system for moving activity messages from producer applications to consumer applications. In addition or alternatively, activity messages may be obtained directly from the producer applications that generate them. For example, activity messages may be obtained from the producer applications in network messages/packets sent over a data network by the producer applications. In addition or alternatively, activity messages may read from file system files (e.g., log files) containing the activity messages and generated by the producer applications. In addition or alternatively, activity messages may be read from a database storing the activity messages.

According to an embodiment, activity messages are obtained during a "sample period". The sample period may correspond to a certain period of time or a certain number of obtained activity messages. Activity messages obtained during a sample period are referred to hereinafter as "activity messages samples", or just "samples". A single activity message obtained during a sample period is referred to hereinafter as an "activity message sample", or just "sample".

As described hereinafter, schemas are inferred from sets of related samples ("sample sets"). Each sample set includes samples obtained during a sample period. Multiple sample sets may have the same sample period. For example, the sample period for one sample set may be N number of samples and the sample period for another sample set may also be N number of samples. Different sample sets can also have different sample periods. For example, the sample period for one sample set may be one hour and the sample period for another sample set may be ten minutes. Two or more different sample sets may contain mutually exclusive sets of samples. Alternatively, the same sample can belong to two or more sample sets.

Sample Sets

In one embodiment, as described in greater detail below, a schema is inferred from a "sample set" of related samples. A sample set is a set of related samples obtained during a sample period. For example, the samples generated by a particular producer application obtained within the past hour may be a sample set. As another example, a most recently obtained number of samples generated by a particular producer application may be a sample set.

In one embodiment, samples obtained during a sample period are related together in a sample set based on intrinsic properties of the samples. Properties of samples may be included in the samples before they are obtained. For example, properties may be included in samples when they are generated by a producer application, or as a result of then being processed when passing through a data pipeline.

In one embodiment, a property of a sample is name-value pair extracted from the sample based on an analysis of the sample. For example, the analysis may involve parsing text or character string data of the sample. In one embodiment, the name of an extracted property is represented in a computer as a character string data, but may be represented by another computer data type such as, for example, a number. In one embodiment, the value of a property is represented in a computer by a character string, a number, an array or other ordered list of values, a Boolean (e.g., TRUE/FALSE), no value (e.g., NULL), or another sample. Thus, samples may be nested in other samples to form a hierarchy of samples. A sample in a parsed form, including any samples nested therein, may be represented (stored) in a computer memory as a collection of name/value pairs (i.e., properties). For example, the collection may be implemented in a computer as an object, a record, a struct, a dictionary, a hash table, a keyed list, an associative array, or other suitable data structure.

According to one embodiment, samples are related together in the same sample set based on a "routing-key" property of the samples. For example, samples that have the same "routing-key" property value may be related together in the same sample set. In one embodiment, the value of the "routing-key" property of a sample is used by a message brokering application or other middleware application such as, for example, the RabbitMQ open source messaging software. In one embodiment, the name of the "routing-key" property in a sample is "routing-key". However, a different property name may be used according to the requirements of the particular implementation at hand.

In addition to or instead of the routing key property, samples can be related together in the same sample set based on the "source" of the samples as reflected by one or more properties of the samples. In one embodiment, the source of a sample is one of, or a combination of, the following, each of which may be specified by one or more properties of the sample:

The producer application that generated the sample, or
The type of client operating system interacting with the producer application that caused the producer application to generate the sample.

For example, a particular property of the sample named "application-id" may have a value that specifies an identifier of the producer application that generated the sample. As another example, another particular property of the sample named "client-type" may have a value that specifies the type of operating system installed on the client that caused the producer application to generate the sample. For example, the value of the "client-type" property may indicate a conventional operating system such as, for example, a version of MICROSOFT WINDOWS, APPLE IO, or ANDROID. In one embodiment, the name of the "application-id" property in a sample is "application-id". However, another name may be used according to the requirements of the particular implementation at hand. In one embodiment, the name of the "client-type" property in a sample is "client-type". However, another name may be used according to the requirements of the particular implementation at hand.

While in some embodiments, samples are related together in the same sample set based on one or more of the "routing-key", "application-id", and "client-type" properties of the samples, samples are related together in the same sample set based on other properties of the samples in other embodiments. Generally, samples may be related together in the same sample set based on the values of one or more designated properties of the samples. Typically, such designated properties will be ones that occur in most, if not all, of the samples. For example, samples can be related together in sample sets based one or more properties of the samples that conform to an Advanced Message Queuing Protocol (AMQP) model. For example, samples can be related together sample sets based on one or more of a "Content type" property, a "Content encoding" property", a "Routing key" property", a "Delivery mode" property, "a Message priority" property", a "Message publishing timestamp" property", an "Expiration period" property", or a "Publisher application id" property of the samples.

In one embodiment, relating samples together in the same sample set includes detecting samples that have the same or similar values for the same set of one or more designated properties. Similarity can be syntactic or semantic similarity according to the requirements of the particular implementation at hand. For example, two or more samples obtained during a sample period that have the same values for the "routing-key" property may be related together in the sample set. As another example, two or more samples obtained during a sample period that have the same values for the "application-id" and "client-type" properties may be related together in another sample set.

Schema Counters

According to an embodiment, information used to infer a schema is collected during a sample period based on the samples related together in a sample set during the sample period. More specifically, a set of one or more "schema counters" is maintained for each uniquely named property identified in the samples in the sample set.

The uniquely named properties may be identified, and the associated schema counters for the uniquely named properties updated, as or just after the samples in the sample set are obtained. In this case, once uniquely named properties in an obtained sample have been identified and the associated schema counters for the uniquely named properties identified in the sample updated, the sample may be discarded. The sample need not be persisted to disk or other non-volatile data storage medium. This allows efficient processing of a large volume of samples by avoiding persisting the obtained samples to a non-volatile data storage device (e.g., a hard disk), which typically has higher access latency and lower throughput than volatile data storage devices (e.g., RAM). For example, schemas can be inferred from millions of samples or more obtained per second.

In an embodiment, to identify uniquely named properties in an obtained sample and to update associated schema counters, the sample is parsed to identify properties in the sample and to produce a data structure representation of the properties of the sample. The data structure may be any computer data structure suitable for storing and representing the properties in a computer memory. For example, the data structure can be an object, a record, a struct, a dictionary, a hash table, a keyed list, an associative array, or other data structure suitable for storing and representing an unordered set of properties where the value of a property can be a string value, a number value, an unordered set of properties, an array or other ordered list of values, a Boolean value, or no value (e.g., NULL).

The parsing technique used to produce a data structure representation of the properties of an obtained sample may vary depending on the data format of the obtained sample. For example, if the data format of the obtained sample is eXtensible Markup Language (XML), then a parsing technique for parsing XML syntax may be used. Alternatively, as another example, if the data format of the obtained sample is JavaScript Object Notation (JSON), then a parsing technique for parsing JSON syntax may be used. Generally, any parsing technique suitable for identifying properties in an obtained sample and representing the identified properties in a computer as a data structure that facilitates iterating over the identified properties may be used.

Once the data structure representation of the identified properties of the sample is produced, the uniquely named properties of the sample are identified by iterating over the properties in the data structure, including all nested properties in the data structure. For each uniquely named property identified in the data structure, the following may be determined in addition to the value of the property itself:

The primary data type of the property value, and
The sub-data type of the property value.

The primary type of the property value may be one of a character string data type, a number data type, an data type for an unordered set of properties, a data type for an ordered list of values, a Boolean data type, or a no value data type (e.g., NULL). The primary type of the property value may be determined by performing a type detection operation on the property value. For example, the type detection operation may be a standard library function that accepts a value as input and returns a data type designated as output. Examples of a data type an ordered set of properties include an object, a record, a struct, a dictionary, a hash table, a keyed list, and an associative array. Examples of a data type for an ordered list of values include an array, a vector, and a list. In some cases where the primary data type of the property value cannot be determined, the primary data type is UNKNOWN or other information indicating that the primary data type of the property value could not be detected.

Detection of the sub-data type of the property value may be dependent on its primary type. In an embodiment, if the primary type of the property value is a character string data type, then the sub-data type of the property values is detected by pattern matching. For example, one or more regular expressions representing character string patterns of one or more sub-data types respectively may be applied to the property value. If the character string property value matches (satisfies) one of the regular expressions, then the property value may be considered to be of the corresponding sub-data type. For example, a regular expression may be applied to the property value to determine whether the property value is in the form of a URL as defined in Request for Comments (RFC) standards document 1738. As another example, a regular expression may be applied to the property value to determine whether the property value is in the form of an Internet mail address as described in RFC standards document 5322. Other types of character string patterns may be detected using regular expressions as one skilled in the art will understand. For example, a regular expression may be applied to the property value to determine whether the property value is in the form of a calendar date or timestamp. In some cases where the primary data type of the property value does not have any sub-data types, the sub data-type of the property value is NOT APPLICABLE or other information indicating that the property value does not have sub-data type. In some cases where the primary data type of the property value has sub data-types but none of the sub data-types were detected for the property value, the sub data-type of the property value is UNKNOWN or other information indicating that the sub data-type of the property value could not be detected.

In an embodiment, if the primary type of the property is a number data type, then the sub-data type of the property is detected by applying a type detection operation on the property value that determines the type of number. The type detection operation may be implemented by a standard library, for example. The type detection operation may specify whether the property value is an integer or a floating point number, for example.

In one embodiment, for a sample that is nested within another sample, a property of the nested sample is made unique by combining the name of the property in the nested sample with the name of the property in the other sample having the nested sample as its value. This may be done for arbitrary levels of sample nesting to generate a unique property name for nested properties (i.e., a property of a sample that is nested in another sample, and which itself may be nested in another sample, and so on).

After the primary data type, optionally the sub-data type, and the value of a uniquely named property in a sample has been identified, a set of schema counters maintained for the uniquely named property and the sample set to which the sample belongs is updated. In one embodiment, the set of schema counters maintained for each uniquely named property identified from obtained samples that belong to a sample set include one or more of:

Primary Data Types List: A list of one or more primary types of the property that have been identified in the obtained samples. And for each primary type, a count of how many times the property has been identified in the obtained samples with that primary type. The Primary Data Types List may be represented (stored) in a computer memory in a data structure suitable for representing the information contained in the Primary Data Types List. For example, the data structure can one suitable for representing an unordered set of properties in which the names of the properties represent the names of the primary data types in the list and the values of the properties represent the count of how many times the uniquely named property has been identified in the obtained samples with the corresponding primary type.

Sub-Data Types List: For each primary data type in the Primary Data Type List, a list of one or more sub data-types of the property that have been identified in the obtained samples. And for each sub data-type in the list, a count of how many times the property has been identified in the obtained samples with that sub data-type. The Sub-Data Types List may be represented (stored) in a computer memory in a data structure suitable for representing the information contained in the Sub-Data Types List. For example, the data structure can one suitable for representing an unordered set of properties in which the names of the properties represent the names of the sub-data types in the list and the values of the properties represent the count of how many times the uniquely named property has been identified in the obtained samples with the corresponding sub-data type.

Unique Values List: A list of one or more unique values of the property that have been identified in the obtained samples. And for each value in the list, a count of how many times the property has been identified in the obtained samples with that value. The Unique Values List may be represented (stored) in a computer memory in a data structure suitable for representing the information contained in the Unique Values List. For example, the data structure can one suitable for representing an unordered set of properties in which the keys of the properties are the unique values in the list and the values of the properties represent the count of how many times the uniquely named property has been identified in the obtained samples with the corresponding unique value.

Once the sample period has expired, schema counters have been collected for uniquely named properties identified in samples obtained during the sample period and belonging to the sample set. Thus, the schema counters are collected from the samples belong to the sample set. Once the sample period has expired, a schema is inferred from the collected schema counters.

In an embodiment, schema counters for a sample set are represented (stored) in a computer memory as a data structure representing an unordered set of properties. For example, the data structure may be an object, a record, a struct, a dictionary, a hash table, a keyed list, or an associative array. The name of each property in the set corresponds to a uniquely named properties identified during the sample period in the samples that belong to the sample set. The value of each property includes the Primary Data Types List, the Sub-Data Types List, and the Unique Values List for the corresponding uniquely named property.

Schema Inference

According to an embodiment, a schema is inferred from the schema counters collected from samples belonging to a sample set over a sample period. In an embodiment, the following schema information is inferred for each uniquely named property of the schema counters:

A primary data type for the property;

A sub-data type for the property;

Whether the value for the property can contain no value? (i.e., is nullable?)

Whether the property is required?

A list of possible values for the property.

In an embodiment, if the Primary Data Types List for a property contains more than one primary data type, then the primary data type for the property is determined as the primary data type in the Primary Data Types List with the highest associated count value. That is, the primary data type most often identified for the property in the samples obtained for the sample set during the sample period. Otherwise, the primary data type is determined as the one primary data type in the Primary Data Types List for the property.

In an embodiment, if the Sub-Data Types List for a property contains more than one sub-data type, then the sub-data type for the property is determined as the sub-data type in the Sub-Data Types List with the highest associated count value. That is, the sub-data type most often identified for the property in the samples obtained for the sample set during the sample period. Otherwise, the sub-data type is determined as the one sub-data type in the Sub-Data Types List for the property.

In an embodiment, the property is determined to be nullable if a NULL or a no-value exists in the Unique Values List for the property. If one does not exist, then the property is determined to not be nullable.

In an embodiment, the property is determined to be required if the property was identified in every sample belonging to the sample set during the sample period. Otherwise, the property is determined not to be required.

In an embodiment, if the Unique Values List for a property contains less than a predetermined threshold number of values, the set of possible values for the property is determined as the Unique Value List for the property. The threshold number may set based on the number of samples.

For example, the threshold number may be set larger or smaller depending on the number of samples in the sample set. In an embodiment, the threshold number is set based on a percentage of the number of samples in the sample set. For example, if the number of values in the Unique Value List for a property is less than 50% of the total number of samples in the sample set, this may indicate that the values for the property are not random or unique per sample. On the other hand, if the number of values in the Unique Value List for the property is close to 100% of the total number of samples in the sample set, this indicates that the values for the property are random or unique per sample. If this case, the set of possible values for the property is determined as "random", "unique", or some other value indicating that the values for the property are random or unique.

A schema inferred from schema counters collected from samples belonging to a sample set over a sample period is stored in a schema repository or other database. The stored schema can include the information inferred for each uniquely named property of the schema counters including, for each uniquely named property of the schema counters, information about the determined primary type of the property, the determined sub-data type of the property, whether the property is nullable, whether the property is required, and the list of possible values for the property.

The information stored in the schema repository or database for a schema may be associated in the schema repository or database with an identifier of the schema. In an embodiment, the identifier is composed of the values of the properties used to related obtained samples together in the sample set for which the schema was inferred. For example, the identifier can be a combination of one or more "routing-key", "application-id', or "client-type" property values identified in the samples that belong to the sample set.

By storing schema information in a schema repository or database, the schemas can be retrieved for later inspection. For example, persons responsible for consumer applications within the online service can query the repository or database to discover what activity information is being produced by the producer applications and to formulate binding rules for obtaining specific activity information of interest. For example, schema for activity information generated by a particular producer application can be retrieved for inspection by querying the repository or database with the "application-id" of the Schema Changes Once an initial schema has been inferred from a sample set, another schema can be inferred from a subsequent sample set. Both schemas may be associated with the same schema identifier in a schema repository or database and samples may be related together in the two sample sets based on the samples having the same property values. For example, samples in the initial sample set and samples in the subsequent sample may all have the same value for the "routing-key" property or the "application-id" property.

After the two schemas have been inferred, the two schemas can be compared to each other to determine whether the schemas differ. The schema change detection process can be performed in a continuous or on-going manner. For example, sample sets can continually be collected over sample periods, schemas continually inferred from the sample sets, and schemas inferred from later collected sample sets to schema inferred from prior collected sample sets to detect changes to schemas over time.

In an embodiment, comparing two schemas together to detect changes involves comparing the set of unique property names in one of the schemas to the set of unique property names in the other of the schemas. In addition, comparing the two schema involves comparing schema information for each common property between the two schemes. In an embodiment, a change between two compared schemas is detected when any of the following is detected by the comparison:

The sets of unique property names of the two schemas differ. The sets differ if one set contains a unique property name that is not in the other set, or For any common property name in both of the sets, any of the following schema information is different between the two common properties:

The primary type is different between the two common properties,

The sub-type is different between the two common properties,

The common property is required by one schema but not required by the other schema.

The common property is nullable according to one schema but not nullable according to the other schema.

The set of possible values between the two common properties is different.

In an embodiment, the set of possible values between the two common properties is detected as different if one set of possible values contains a value that is not contained in the other set. When comparing values in this regard, an exact match can be required to detect two values as equal. Alternatively, a fuzzy matching algorithm can be applied to two values to determine whether they are "equal".

When a schema change is detected, persons associated with binding rules can be notified of the change.

Binding Rules

A binding rule is pre-arranged criteria used by a publish-subscription system, a messaging queuing system, or other messaging brokering system for routing activity messages obtained from producer applications toward consumer applications. In these systems, binding rules are used by components within the systems that receive activity messages from producer applications to route the activity messages to message queues within the systems. The message queues holds (stores) activity messages and forwards them to consumer applications. The system can either "push" the activity messages from the message queues to the consumer applications. Alternatively, the consumer applications can "pull" the activity messages from the message queues, depending on the requirements of the particular implementation at hand.

In an embodiment, the pre-arranged criteria of a binding rule specifies conditions on activity messages that satisfy the binding rule. The conditions may be in terms of properties of the activity messages. For example, a condition may specify names and values of properties of the activity messages. A possible condition of a binding rule is: "routing-key=STOCK.USD.ACME". In this case, the condition of the binding rule is not satisfied by an activity message unless the activity messages contains the property routing-key=STOCK.USD.ACME". Binding rule conditions may be expressed in terms of properties other than just a "routing-key" property.

In an embodiment, identifiers of inferred schemas are associated with identifiers of binding rules in a schema repository or database. In addition, the identifiers of the binding rules are associated with contact information. The contact information may be e-mail addresses, phone numbers, or other information for contact a person electronically. The purposes of associated schema with binding rules and binding rules with contacts is to be able to automatically notify the contacts when a change to a schema is detected.

In an embodiment, an identifier of a schema is associated in the repository or database with one or more binding rule identifiers and each of the one or more binding rule identifiers is associated in the repository or database with contact information for one or more contacts. The set of binding rule identifiers associated with the schema represent binding rules that may be affected if the schema of the activity messages from which the schema was inferred is changed. The contacts associated with one of the binding rules represents a person or persons who should be notified if the schema of the activity messages from the schema was inferred is changed. The purpose of such notification is to inform a person or persons responsible for the binding rules so that the binding rules can be corrected or modified based on the detected schema change.

In an embodiment, the notification includes, or includes a hyperlink to, information about what changed in the current version of the schema relative to a previous version of the schema. For example, the information may specify the identifier of the schema that changed, any uniquely named properties that were removed from the current version of the schema relative to the previous version of the schema, any uniquely named properties that were added in the current version of the schema relative to the previous version of the schema, any properties that are now or are no longer nullable in the current version of the schema relative to the previous version, any properties that are now or no longer required in the current version of the schema relative to the previous version, and properties for which the possible values have changed between the current and previous versions. In addition or alternatively, the notification can provide, or provide a hyperlink to, both the current and previous versions of the schema for comparison by the recipient of the notification.

Figure 1:
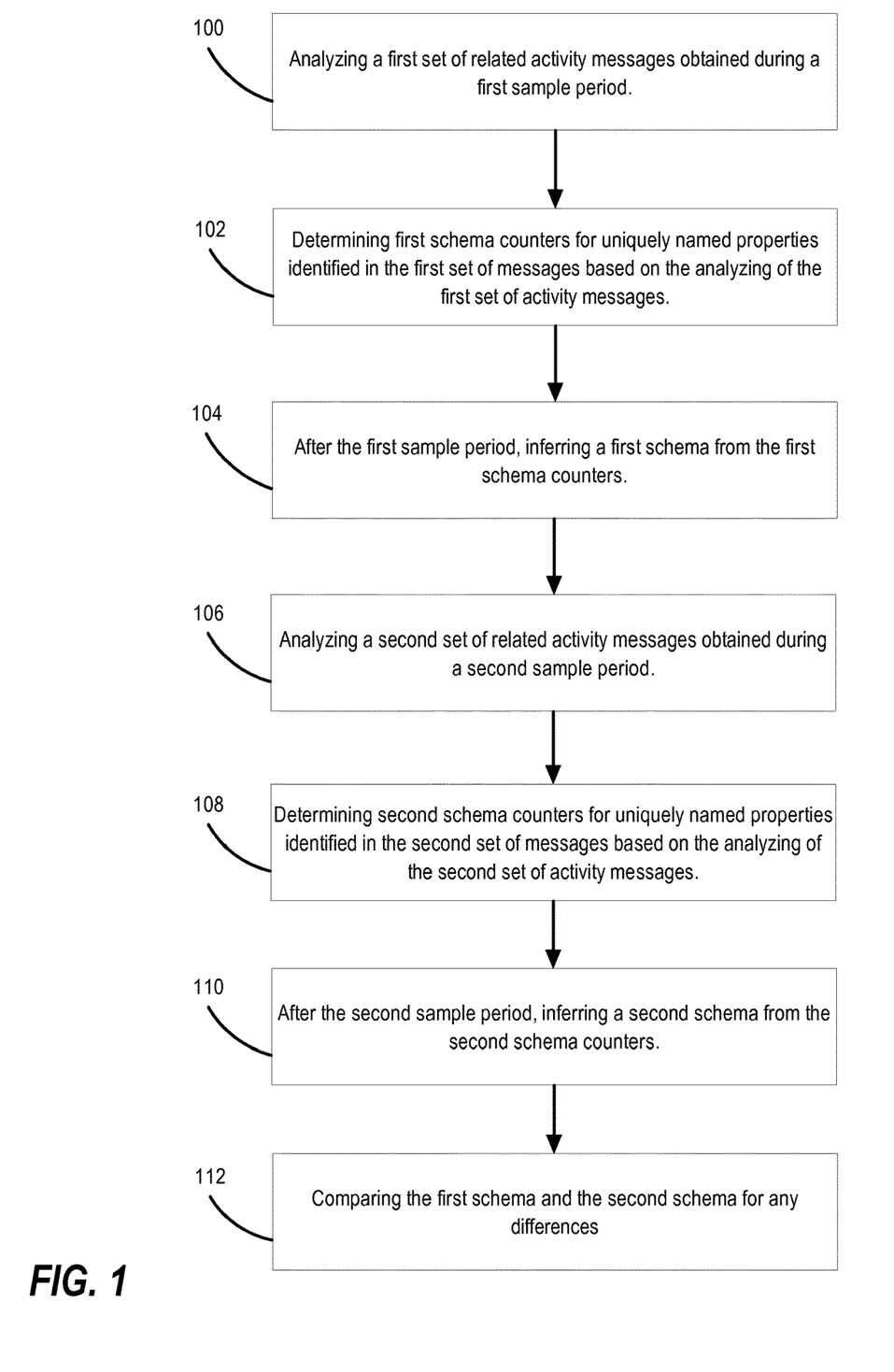
FIG. 1 is a flowchart illustrating steps perform by a service that uses activity information to provide and support the service.

Activity Information Schema Discovery and Schema Detection and Notification Process Referring now to FIG. 1, it is a flowchart illustrating steps performed by an online service that generates activity messages, according to one embodiment. In some embodiments, the steps are performed at one or more computing devices with one or more processors and memory, and one or more programs stored in the memory that execute on the one or more processors.

At step 100, a first set of related activity messages obtained during a first sample period is analyzed. For example, the first sample period may correspond to a predetermined period of time or a predetermined number of activity messages. The activity messages may be related together in the first set based on one or more properties of the activity messages. For example, the activity messages may be related together in the first set based on values for one or more of a "routing-key" property, an "application id" property, and/or a "client-type" property. Analyzing the activity message can include parsing each of the activity messages into a set of unordered properties.

At step 102, first schema counters for uniquely named properties identified in the first set of activity messages are determined based on the analyzing performed at step 100. For example, determining the first schema counters can include parsing the activity messages into sets of unordered properties and determining schema counters for identified uniquely named properties based on the sets of unordered properties.

In an embodiment, steps 100 and 102 are performed during the first sample period. In particular, each activity message in the first set obtained during the sample period is analyzed during the sample period in accordance with step 100 and then schema counters for uniquely named properties identified in the activity message based on the analyzing of the activity message in accordance with step 100 are determined in accordance with step 102. Thus, each activity message in the first set can be analyzed (e.g., parsed into a set of unordered properties) and schema counters determined for the analyzed activity message as each activity message in the first set is obtained during the first sample period.

In an embodiment, once schema counters for an analyzed activity message have been determined in accordance with step 102, the results of analyzing the activity message in accordance with step 100 can be discarded. For example, once schema counters for an activity message have been determined based on a set of unordered properties in accordance with step 102, the data structure storing the set of unordered properties can be released (freed) from memory.

At step 104, a first schema is inferred after the first sample period from the first schema counters determined at step 102. For example, inferring the first schema can include performing, for each of the uniquely named properties identified in the first set of activity messages based on the analyzing performed at step 100, and based on the schema counters determined at step 102, one or more of the following:

a primary data type of the uniquely named property,
a sub data-type of the uniquely named property,
whether the uniquely named property is nullable,
whether the uniquely named property is required, or
the possible values for the uniquely named property.

At step 106, a second set of related activity messages obtained during a second sample period is analyzed. The criteria for relating the second set of activity messages together in the second set may be same as the criteria used for relating the first set of activity messages together in the first set. For example, the activity messages in the first set and the second set may all have the same value for a "routing-key" property. Typically, the first set of activity messages obtained during the first sample period is obtained before the second set of activity messages is obtained. That is, the last activity message obtained in the first set is obtained before the first activity message in the second set is obtained.

At step 108, second schema counters for uniquely named properties identified in the second set of activity messages are determined based on the analyzing performed at step 106. Like steps 100 and 102 can be performed during the first sample period, steps 106 and 106 can be performed during the second sample period.

At step 110, a second schema is inferred after the second sample period from the second schema counters determined at step 108.

At step 112, the first schema and the second schema are compared for any differences. If differences exist based on the comparison, a notification may be automatically sent. For example, an e-mail or text message notification can be sent responsive to detecting at least one difference between the first schema and the second schema.

Implementing Computing Device

Figure 2:
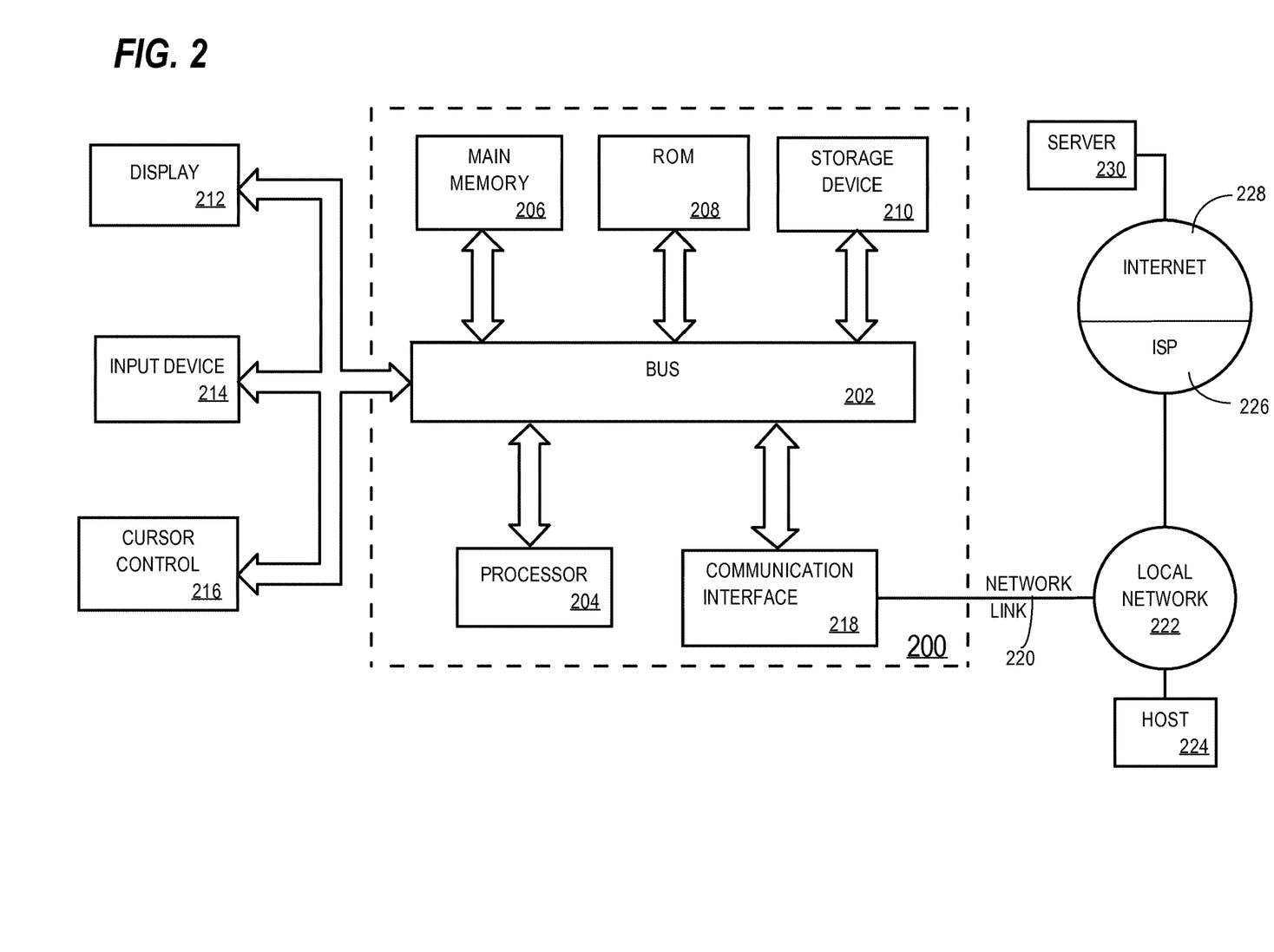
FIG. 2 is a block diagram of a computer system upon which embodiments of the invention may be implemented.

In some embodiments, the techniques are implemented one or more computing devices. For example, FIG. 2 is a block diagram that illustrates a computing device 200 in which some embodiments of the present invention may be embodied. Computing device 200 includes a bus 202 or other communication mechanism for communicating information, and a hardware processor 204 coupled with bus 202 for processing information. Hardware processor 204 may be, for example, a general purpose microprocessor or a system on a chip (SoC).

Computing device 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computing device 200 into a special-purpose machine that is customized to perform the operations specified in the instructions.

Computing device 200 further includes a read only memory (ROM) 208 or other static storage device coupled to bus 202 for storing static information and instructions for processor 204.

A storage device 210, such as a magnetic disk, optical disk, or solid-state drive is provided and coupled to bus 202 for storing information and instructions.

Computing device 200 may be coupled via bus 202 to a display 212, such as a liquid crystal display (LCD) or other electronic visual display, for displaying information to a computer user. Display 212 may also be a touch-sensitive display for communicating touch gesture (e.g., finger or stylus) input to processor 204.

An input device 214, including alphanumeric and other keys, is coupled to bus 202 for communicating information and command selections to processor 204.

Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computing device 200 may implement the techniques described herein using customized hard-wired logic, one or more application-specific integrated circuits (ASICs), one or more field-programmable gate arrays (FPGAs), firmware, or program logic which, in combination with the computing device, causes or programs computing device 200 to be a special-purpose machine. According to some embodiments, the techniques herein are performed by computing device 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computing device 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computing device 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computing device 200, are example forms of transmission media.

Computing device 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

A software system is typically provided for controlling the operating of computing device 200. The software system, which is usually stored in main memory 206 and on fixed storage (e.g., hard disk) 210, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, or LINUX.

One or more application(s), such as client software or "programs" or set of processor-executable instructions, may also be provided for execution by computer 200. The application(s) may be "loaded" into main memory 206 from storage 210 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computing device in accordance with instructions from OS and/or application(s). The graphical user interface also serves to display the results of operation from the OS and application(s).

Extensions and Alternatives

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method for activity information schema discovery, comprising:
at one or more computing devices with one or more processors and memory, and one or more programs stored in the memory that execute on the one or more processors:
receiving, over a network and during a sample period, a first set of network packets that include a set of related activity messages generated by at least one software application coupled to the network;
generating a computer data structure for representing a plurality of properties included in the set of related activity messages;
iterating through the plurality of properties represented in the computer data structure to identify a uniquely named property in the set of related activity messages;
determining a first plurality of schema counters for the uniquely named property identified in the set of related activity messages, wherein each of the first plurality of schema counters is associated with a different data type and indicates a number of instances, within the set of related activity messages, that a corresponding value of the uniquely named property is of the data type associated with the schema counter;
after the sample period, inferring, by at least one processor, a schema implemented by the at least one software application from at least the first plurality of schema counters, wherein the schema specifies that the uniquely named property is of a first data type associated with a first schema counter in the plurality of schema counters that has a higher value relative to other schema counters in the plurality of schema counters;
receiving, over the network and during a second sample period, a second set of network packets that include a second set of related activity messages generated by the at least one software application coupled to the network; and
in response to receiving the second set of network packets, executing a binding rule associated with the schema to:
determine that the uniquely named property in the second set of related activity messages is of a second data type different than the first data type specified in the schema, and
electronically transmit a notification to a contact specified in the binding rule, wherein the notification indicates that the uniquely named property in the second set of related activity messages is of the second data type.

2. The method of claim 1, further comprising: relating the activity messages together in the set based on one or more properties of the activity messages.

3. The method of claim 1, wherein the sample period corresponds to a period of time or a predetermined number of obtained activity messages.

4. The method of claim 1, further comprising: parsing at least one of the activity messages into a set of unordered properties; and determining the first plurality of schema counters for the uniquely named property identified in the activity message based on the set of unordered properties.

5. The method of claim 1, further comprising: determining the first plurality of schema counters for the uniquely named property identified in the set of related activity messages based on analyzing values of the uniquely named property identified in the set of related activity messages.

6. The method of claim 1, further comprising: after the sample period, inferring, for the uniquely named property, based the first plurality of schema counters, at least one of the following:
a data type of the uniquely named property,
whether the uniquely named property is nullable,
whether the uniquely named property is required, or
one or more possible values for the uniquely named property.

7. A method for activity information schema discover and schema change detection, comprising:
at one or more computing devices with one or more processors and memory, and one or more programs stored in the memory that execute on the one or more processors:
receiving, over a network and during a first sample period, a first set of network packets that include a set of related activity messages generated by at least one software application coupled to the network;
generating a computer data structure for representing a plurality of properties included in the set of related activity messages;
iterating through the plurality of properties represented in the computer data structure to identify a uniquely named property in the set of related activity messages;
determining a first plurality of schema counters for the uniquely named property identified in the set of related activity messages, wherein each of the first plurality of schema counters is associated with a different data type and indicates a number of instances, within the set of related activity messages, that a corresponding value of the uniquely named property is of the data type associated with the schema counter;

after the first sample period, inferring, by at least one processor, a schema implemented by the at least one software application from at least the first plurality of schema counters;
receiving, over the network and during a second sample period, a second set of network packets that includes a second set of messages generated by at least one software application coupled to the network;
identifying a second uniquely named property in the second set of messages;
determining a second plurality of schema counters for the second uniquely named property identified in the second set of messages, wherein each of the second plurality of schema counters indicates a number of instances, within the second set of messages, that a corresponding value of the second uniquely named property is associated with a second data type;
after the second sample period, inferring a second schema from at least the second plurality of schema counters;
comparing the first schema and the second schema to identify a first difference between the first schema and the second schema; and
executing a binding rule associated with the schema to electronically transmit a notification to a contact specified in the binding rule, wherein the notification indicates the first difference.

8. The method of claim 7, further comprising: relating the activity messages in the first set together in the first set based on a first set of one or more designated properties of the first set of related activity messages; relating the activity messages in the second set together in the second set based on a second set of one or more designated properties of the second set of messages; and wherein the first set of one or more designated properties is the same as the second set of one or more designated properties.

9. The method of claim 7, wherein the first set of related activity messages obtained during the first sample period is obtained before the second set of activity messages is obtained.

10. One or more non-transitory computer-readable media storing instructions which, when executed by one or more computing devices, cause the one or more computing devices to perform the steps of:
receiving, over a network and during a sample period, one or more network packets that include a set of messages generated by at least one software application executing within the network;
generating a computer data structure for representing a plurality of properties included in the set of messages;
iterating through the plurality of properties represented in the computer data structure to identify a uniquely named property in the set of messages;
determining a first plurality of schema counters for the uniquely named property identified in the set of messages, wherein each of the plurality of schema counters is associated with a different data type and indicates a number of instances, within the set of messages, that a corresponding value of the uniquely named property is of the data type associated with the schema counter;
after the sample period, inferring, by at least one processor, a schema implemented by the at least one software application from at least the first plurality of schema counters, wherein the schema specifies that the uniquely named property is of a first data type associated with a first schema counter in the plurality of schema counters that has a higher value relative to other scheme counters in the plurality of schema counters;
receiving, over the network and during a second sample period, a second set of network packets that include a second set of related activity messages generated by the at least one software application coupled to the network; and
in response to receiving the second set of network packets, executing a binding rule associated with the schema to:
determine that the uniquely named property in the second set of related activity messages is of a second data type different than the first data type specified in the schema, and
electronically transmit a notification to a contact specified in the binding rule, wherein the notification indicates that the uniquely named property in the second set of related activity messages is of the second data type.

11. The media of claim 10, further comprising the steps of: relating the activity messages together in the set based on one or more properties of the activity messages.

12. The media of claim 10, wherein the sample period corresponds to a period of time or a predetermined number of obtained activity messages.

13. The media of claim 10, further comprising the steps of: parsing at least one of the activity messages into a set of unordered properties; and determining the plurality of schema counters for the uniquely named property identified in the activity message based on the set of unordered properties.

14. The media of claim 10, further comprising the steps of: determining the plurality of schema counters for the uniquely named property identified in the set of messages based on analyzing values of the uniquely named property identified in the set of messages.

15. The media of claim 10, further comprising the steps of: after the sample period, inferring, for the uniquely named property, based on the first plurality of schema counters, at least one of the following:
a data type of the uniquely named property,
whether the uniquely named property is nullable,
whether the uniquely named property is required, or
one or more possible values for the uniquely named property.

16. One or more non-transitory computer-readable media storing instructions which, when executed by one or more computing devices, cause performance of a method for activity information schema change detection comprising the steps of:
receiving, over a network and during a first sample period, a first set of network packets that includes a first set of messages generated by at least one software application coupled to the network;
generating a computer data structure for representing a plurality of properties included in the first set of messages;
iterating through the plurality of properties represented in the computer data structure to identify a first uniquely named property in the first set of messages;
determining a first plurality of schema counters for the first uniquely named property identified in the first set of messages, wherein each of the plurality of schema counters is associated with a different data type and indicates a number of instances, within the set of messages, that a corresponding value of the uniquely named property is of the data type associated with the schema counter;

after the first sample period, inferring, by at least one processor, a schema from at least the plurality of schema counters;

receiving, over the network and during a second sample period, a second set of network packets that includes a second set of messages generated by at least one software application coupled to the network;

identifying a second uniquely named property in the second set of messages;

determining a second plurality of schema counters for the second uniquely named property identified in the second set of messages, wherein each of the second plurality of schema counters indicates a number of instances, within the second set of messages, that a corresponding value of the second uniquely named property is associated with a second data type;

after the second sample period, inferring a second schema from at least the second plurality of schema counters;

comparing the first schema and the second schema to identify a first difference between the first schema and the second schema; and executing a binding rule associated with the schema to automatically generate an electronic notification for transmission to a contact specified in the binding rule, wherein the electronic notification indicates the first difference.

17. The media of claim 16, the method further comprising the steps of: relating the activity messages in the first set together in the first set based on a first set of one or more designated properties of the first set of messages; relating the messages in the second set together in the second set based on a second set one or more designated properties of the second set of activity messages; and wherein the first set of one or more designated properties is the same as the second set of one or more designated properties.

18. The media of claim 16, wherein the first set of messages obtained during the first sample period is obtained before the second set of messages is obtained.

* * * * *

UNITED STATES PATENT AND TRADEMARK OFFICE
CERTIFICATE OF CORRECTION

PATENT NO. : 10,754,830 B2
APPLICATION NO. : 14/454632
DATED : August 25, 2020
INVENTOR(S) : Landau et al.

It is certified that error appears in the above-identified patent and that said Letters Patent is hereby corrected as shown below:

In the Claims

Column 19, Claim 9, Line 40, please delete "activity";

Column 22, Claim 17, Line 10, please delete "activity";

Column 22, Claim 17, Line 15, please delete "activity".

Signed and Sealed this
Twentieth Day of October, 2020

Andrei Iancu
*Director of the United States Patent and Trademark Office*